(12) United States Patent
Tokuda et al.

(10) Patent No.: US 7,841,628 B2
(45) Date of Patent: Nov. 30, 2010

(54) JOINT FOR USE IN FLUID CONTROL APPARATUS

(75) Inventors: Ichiro Tokuda, Osaka (JP); Michio Yamaji, Osaka (JP); Kenji Tsubota, Osaka (JP); Tsutomu Shinohara, Osaka (JP); Nobukazu Ikeda, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 907 days.

(21) Appl. No.: 11/606,974

(22) Filed: Dec. 1, 2006

(65) Prior Publication Data
US 2007/0132231 A1 Jun. 14, 2007

(30) Foreign Application Priority Data
Dec. 9, 2005 (JP) ............... 2005-356183

(51) Int. Cl.
*F16L 39/00* (2006.01)
(52) U.S. Cl. .................... 285/124.5; 285/422
(58) Field of Classification Search ............. 285/124.5, 285/124.4, 124.3, 124.2, 424
See application file for complete search history.

(56) References Cited

U.S. PATENT DOCUMENTS

| | | | | |
|---|---|---|---|---|
| 3,934,605 | A * | 1/1976 | Legris .................. | 137/271 |
| 4,082,324 | A * | 4/1978 | Obrecht ................. | 285/124.5 |
| 4,392,677 | A * | 7/1983 | Hardouin ............... | 285/124.5 |
| 5,383,689 | A * | 1/1995 | Wolfe, Sr. .............. | 285/124.3 |
| 5,860,681 | A * | 1/1999 | Slais .................... | 285/137.11 |
| 5,979,944 | A * | 11/1999 | Yokoyama et al. ...... | 285/124.3 |
| 5,983,933 | A * | 11/1999 | Ohmi et al. ............ | 137/597 |
| 6,039,360 | A * | 3/2000 | Ohmi et al. ............ | 285/61 |
| 6,361,081 | B1 * | 3/2002 | Yokoyama et al. ...... | 285/124.3 |
| 6,394,138 | B1 * | 5/2002 | Vu et al. ............... | 137/884 |
| 6,546,961 | B2 * | 4/2003 | Fukushima ............ | 137/884 |
| 6,776,193 | B2 * | 8/2004 | Eidsmore .............. | 137/884 |
| 6,874,538 | B2 * | 4/2005 | Bennett ................ | 137/884 |
| 7,048,008 | B2 * | 5/2006 | Milburn ................ | 137/884 |
| 7,146,999 | B2 * | 12/2006 | Giese et al. ........... | 137/269 |
| 7,178,556 | B2 * | 2/2007 | Reid et al. ............. | 137/884 |
| 7,213,618 | B2 * | 5/2007 | Milburn et al. ........ | 137/884 |
| 7,225,835 | B2 * | 6/2007 | Vu ...................... | 137/884 |
| 7,334,605 | B2 * | 2/2008 | Vu ...................... | 137/884 |
| 7,404,417 | B2 * | 7/2008 | Eidsmore .............. | 137/884 |

(Continued)

FOREIGN PATENT DOCUMENTS

JP 2003-322127 11/2003

*Primary Examiner*—David E Bochna
(74) *Attorney, Agent, or Firm*—Kratz, Quintos & Hanson, LLP (57) ABSTRACT

A rectangular parallelepipedal joint for use in fluid control apparatus comprises in its entirety two divided members which are a grooved connecting member having a groove in its center and provided in portions thereof on respective opposite sides of the groove with bolt holes each having a stepped portion for receiving therein a joint attaching bolt without permitting the head thereof to project from the joint and with female screw portions for respective male screw members to be screwed in for attaching an apparatus component; and a flat rectangular parallelepipedal communication member fitting in the groove of the connecting member and provided only with a U-shaped communication channel. The connecting member is made of stainless steel, while the communication member is made of polyamide 6. A positioning protrusion is formed on a bottom face defining the groove of the connecting member and is fitted in a positioning recessed portion formed in the bottom surface of the communication member.

9 Claims, 7 Drawing Sheets

U.S. PATENT DOCUMENTS 7,458,397 B2 * 12/2008 Doyle .......................... 137/884
7,484,770 B2 *  2/2009 Hamada .................. 285/124.5
7,562,677 B2 *  7/2009 Perusek et al. .............. 137/884
2004/0129324 A1 *  7/2004 Vu ............................. 137/884

* cited by examiner

JOINT FOR USE IN FLUID CONTROL APPARATUS

BACKGROUND OF THE INVENTION

The present invention relates to joints for fluid control apparatus for use in semiconductor manufacturing equipment.

JP2003-322127A discloses a rectangular parallelepipedal joint of stainless steel for use in fluid control apparatus comprising a plurality of components arranged in a row. The joint is provided on the apparatus installation side of the apparatus component for causing a fluid passage outlet of one of the two apparatus components in each adjacent pair thereof to communicate with a fluid passage inlet of the other apparatus component, for causing an external inlet pipe to communicate with a fluid passage inlet of the apparatus component at one end of the fluid control apparatus, or for causing an external outlet pipe to communicate with a fluid passage outlet of the apparatus component at the other end of the fluid control apparatus.

Although conventionally installed on horizontal surfaces, fluid control apparatus are recently provided on vertical walls of rooms for the effective use of floor space. The fluid flowing through the communication channels of joints is generally highly corrosive, corrosion-resistant stainless steels are generally used for rectangular parallelepipedal joints. However, the stainless steel is heavy and inconvenient to carry, so that the fluid control apparatus to be installed on the vertical wall by one person or two requires an inefficient work.

An object of the present invention is to provide a joint of reduced weight for use in fluid control apparatus which are convenient to transport or carry and which can be installed on vertical walls with a greatly improved work efficiency.

SUMMARY OF THE INVENTION

The present invention provides a joint for use in fluid control apparatus which fulfills the above object. The joint is adapted for use in fluid control apparatus which comprise a plurality of components arranged in a row, and is used for causing a fluid passage outlet of one of the two apparatus components in each adjacent pair thereof to communicate with a fluid passage inlet of the other apparatus component, for causing a fluid passage outlet of another device or an external inlet pipe extending from a fluid source to communicate with a fluid passage inlet of the apparatus component at one end of the fluid control apparatus, or for causing an external outlet pipe provided for a device requiring a control fluid to communicate with a fluid passage outlet of the apparatus component at the other end of the fluid control apparatus. The joint is provided on the apparatus installation side of the apparatus component and comprises a connecting member having a groove formed therein centrally thereof for the apparatus component to be fixed thereto with male screw members, and a communication member existing in the groove and having a communication channel, the communication member being made of a corrosion-resistant material, the connecting member being made of a material smaller than the material of the communication member in specific gravity.

The joint described for use in effecting fluid channel communication is predominantly made of a material which is smaller in weight than the stainless steel used for conventional joints, with the result that the joint has its weight greatly reduced as compared with those made entirely of stainless steel. Accordingly, regardless of whether the fluid control apparatus is to be installed on a horizontal surface or on a vertical wall, the joint for use in assembling the apparatus is not only easier to carry, but the fluid control apparatus wherein such joints are used can also be installed on a vertical wall with a greatly improved work efficiency. The communication member wherein a highly corrosive fluid flows through its communication channel has corrosion resistance, so that with respect to corrosion resistance, the joint in no way differs from the conventional joint which is made of stainless steel in its entirety.

The connecting member has embedded therein female screw parts for male screw members to be screwed in for mounting the apparatus component. It is desirable to fabricate the joint by casting in its entirety using the forging cast process, using a stainless steel or stainless alloy for the female screw parts and the communication member and using aluminum for the connecting member.

Inconel and Hastelloy are desirable among stainless alloys. Aluminum includes pure aluminum and aluminum alloys.

Useful materials for the communication member which are smaller than the connecting member in specific gravity include synthetic resins in addition to aluminum. Examples of suitable synthetic resins are engineering plastics such as polyamide 6 and polyamide 66.

The present invention will be described further in greater detail with reference to the accompanying drawings.

DESCRIPTION OF THE PREFERRED EMBODIMENTS

Embodiments of the invention will be described below with reference to the drawings. In the following description, the left-hand side of FIG. 1 will be referred to as "front," the right-hand side thereof as "rear," the upper side thereof as "upper," and the lower side thereof as "lower."

Figure 1:
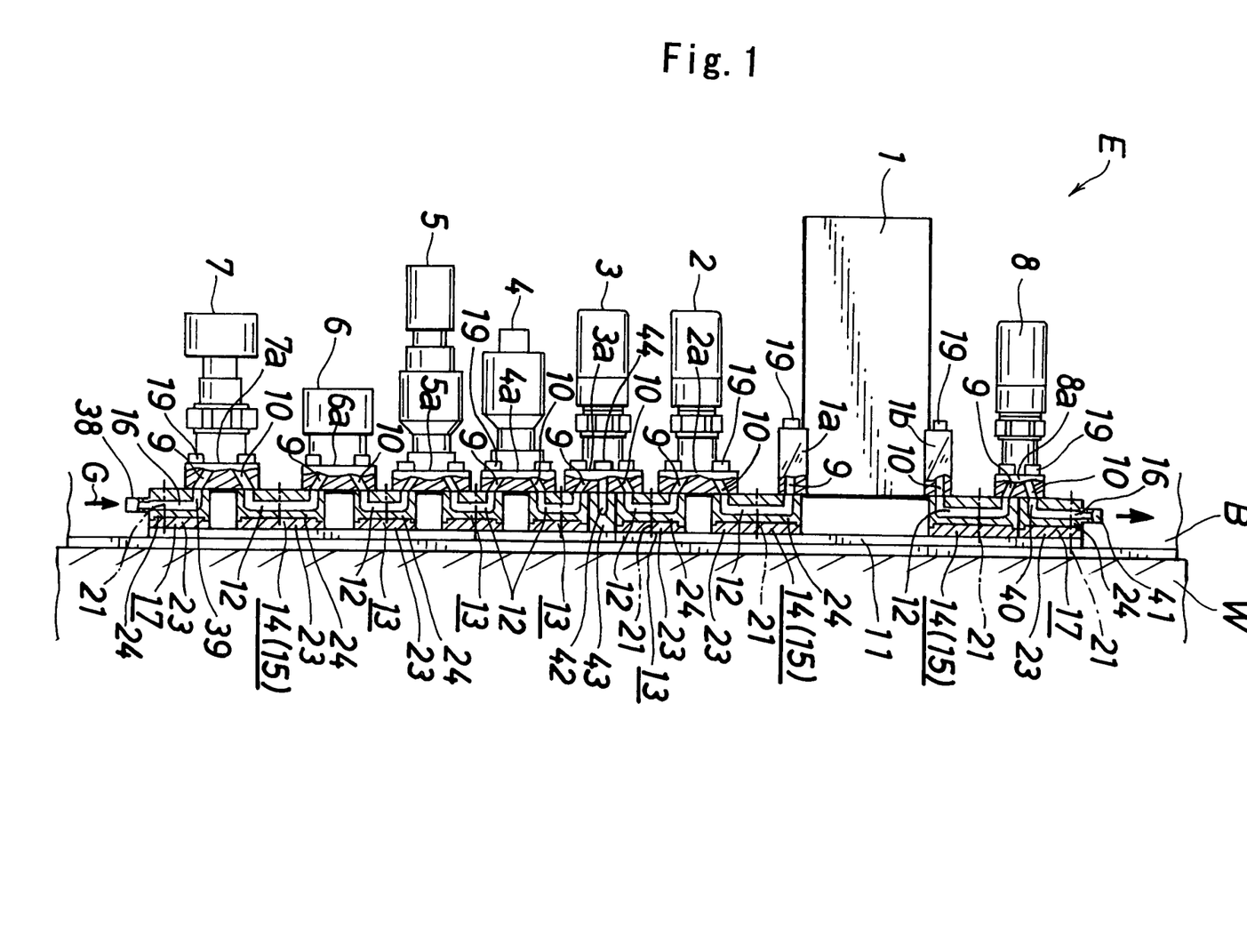
FIG. 1 is a side elevation partly broken away and showing a fluid control apparatus wherein joints of the invention are used and which is adapted for use in semiconductor manufacturing equipment, the apparatus being provided on a vertical wall with its length positioned vertically.
Figure 2:
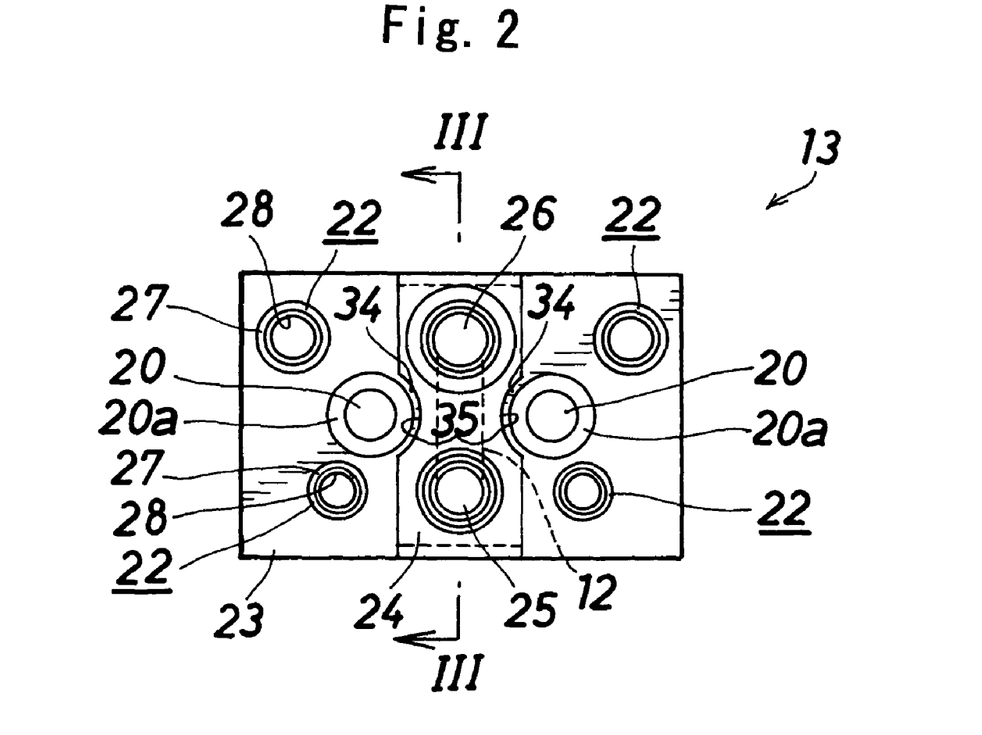
FIG. 2 is an enlarged front view showing in detail a first rectangular parallelepipedal joint as a first embodiment of the invention.
Figure 3:
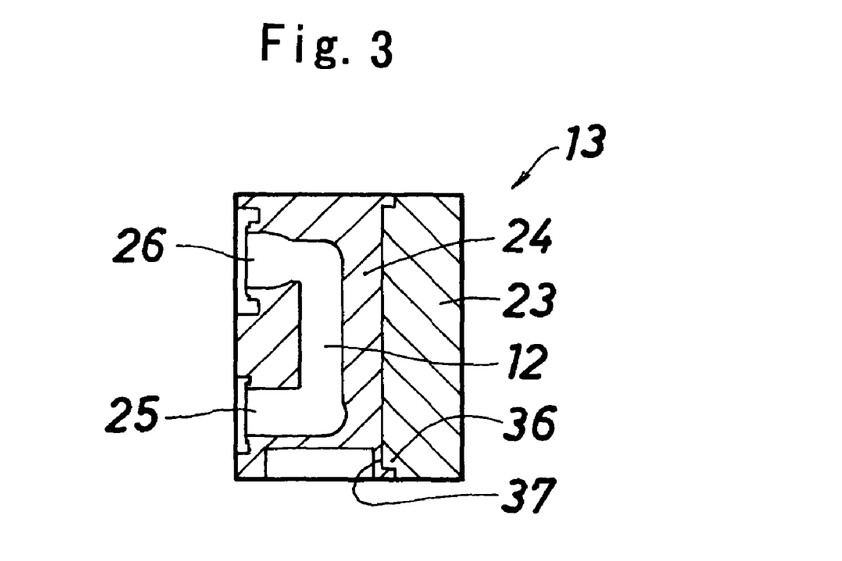
FIG. 3 is a view in section taken along the line III-III in FIG. 2.

FIG. 1 shows a fluid control apparatus E comprising joints of the invention and adapted for use in semiconductor manufacturing equipment, the apparatus being provided within a box B and installed on a vertical wall W with its length positioned vertically. Although not shown, a plurality of like fluid control apparatus E are arranged in parallel each with its length positioned vertically. The fluid control apparatus E comprises, as arranged on a fluid passage inlet side below a mass flow controller 1, a 2-port closing valve 2, 3-port closing valve 3, pressure gauge 4, pressure regulator 5, filter 6 and manual valve 7, these components being arranged from above downward in a row. The apparatus further comprises a 2-port closing valve 8 on a fluid passage outlet side above the controller 1. (These components will be referred to merely as apparatus components 1 to 8.) Rectangular parallelepipedal projections 1a, 1b are provided respectively at the fluid passage inlet side and fluid passage outlet side of the apparatus component 1. Rectangular flanges 2a, 3a, 4a, 5a, 6a, 7a, 8a are provided at the right-hand ends of the other respective components 2 to 8. These portions have rear faces which are all flush with one another. The apparatus components 1 to 8 each have a fluid channel with an inlet 9 and an outlet 10 which are arranged along the length of the fluid control apparatus E, that is, along the direction of flow of a gas fluid, i.e., from below upward.

First rectangular parallelepipedal joints 13, 14, 15, and second rectangular parallelepipedal joints 17 are interposed between a base plate 11 secured to the bottom wall of the box B attached to the vertical wall W and the row of eight components 1 to 8 arranged as spaced apart. Each of the first joints 13, 14, 15 serves to connect the fluid passage outlet 10 of one of the two apparatus components in each adjacent pair 7, 6; 6, 5; 5, 4; 4, 3; 3, 2; 2, 1 or 1, 8 to the fluid passage inlet 9 of the other apparatus component by an internal U-shaped communication channel 12 using respective stainless steel seal members (not shown). (Although FIG. 1 shows the channel 12 as laterally U-shaped, the orientation of the U shape differs with the direction in which the joint is seen, so that the channel is referred to merely as "U-shaped.") The second joint 17 serves to connect an external inlet pipe(not shown) to the fluid passage inlet 9 of the apparatus component 7 at the lower end of the apparatus E, or to connect the fluid passage outlet 10 of the apparatus component 8 at the upper end of the apparatus E to an internal outlet pipe (not shown), by an internal L-shaped communication channel 16 using respective stainless steel seal members (not shown). (Although FIG. 1 shows the channel 12 as inverted L-shaped, the orientation of the L shape differs with the direction in which the joint is seen, so that the channel is referred to merely as "L-shaped.") The first and second joints 13, 14, 15 and 17 are so arranged that their front faces are all flush with one another.

FIGS. 2 to 6 show in detail the first rectangular parallelepipedal joint 13 included among the three kinds of first joints 13, 14, 15 embodying the invention and used in the fluid control apparatus.

The first joint 13 comprises in its entirety two divided members, i.e., a grooved connecting member 23 having a groove 18 extending transversely therethrough at the midportion of its length along the direction of flow of the fluid, i.e., in the vertical direction, and a flat rectangular parallelepipedal communication member 24 fitting in the groove 18 of the connecting member 23 and provided with only the communication channel 12. The connecting member 23 is provided in its portions on opposite sides of the groove 18 with bolt holes 20 for bolts 21 for attaching the joint 13 to the base plate 11, the bolt holes 20 each having a stepped portion 20a for receiving a hexagonal socket head of the bolt 19 without permitting the head to project from the joint 13, and female screw portions 22 for male screw members 19 to be screwed in for attaching the apparatus component. The communication member 24 is made of a stainless steel, while the connecting member 23 is made of polyamide 6 which is a material lower than the stainless steel in specific gravity. The male screw members 19 also each have a hexagonal socket head.

The bolt holes 20 are positioned on opposite sides of lengthwise midportion of the groove 18 close to the groove 18. One pair of female screw portions 22 are positioned on opposite sides of the inlet 25 of the U-shaped communication channel 12, and the other pair of female screw portions 22 are positioned on opposite sides of the outlet 26 of the channel 12. The latter female screw portions 22 are positioned at respective opposite corners of the connecting member 23, while the former female screw portions 22 are positioned close to the groove 18 away from the other respective corners of the connecting member 23. The two pairs are thus different in the spacing between the screw portions because the width of the apparatus component to be attached to the first joint 13 at the inlet 25 of communication channel 12 differs from the width of the apparatus component to be attached thereto at the communication channel outlet 26. Accordingly, if the width relationship between the apparatus components at opposite sides of the first joint 13 is reverse to the above, the first joint 13 is used as turned upside down.

Figure 4:
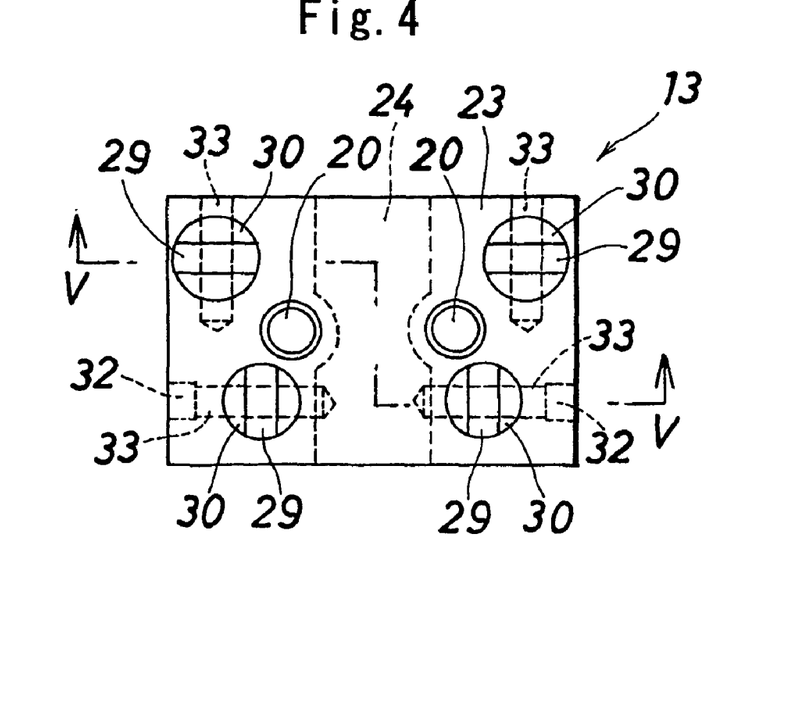
FIG. 4 is a rear view of the first joint of FIG. 2.
Figure 5:
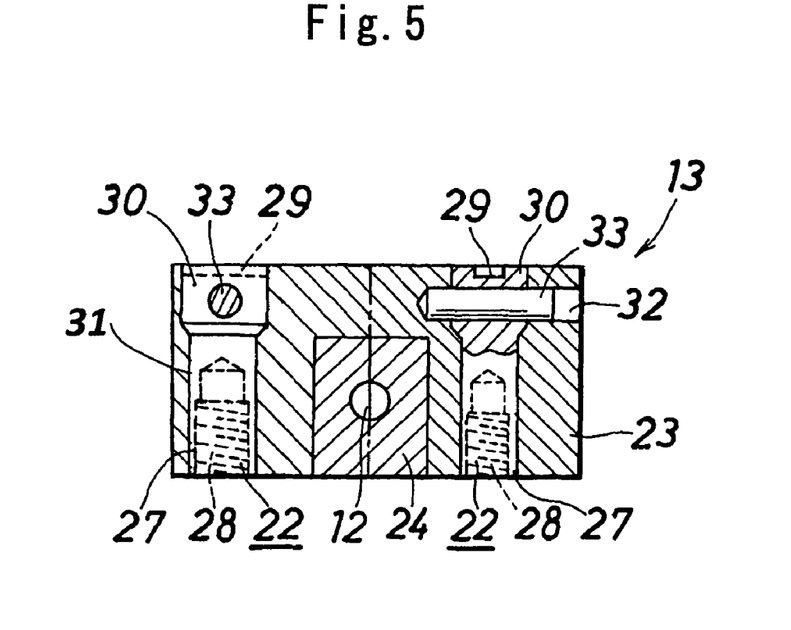
FIG. 5 is a view in section taken along the line V-V in FIG. 4.
Figure 6:
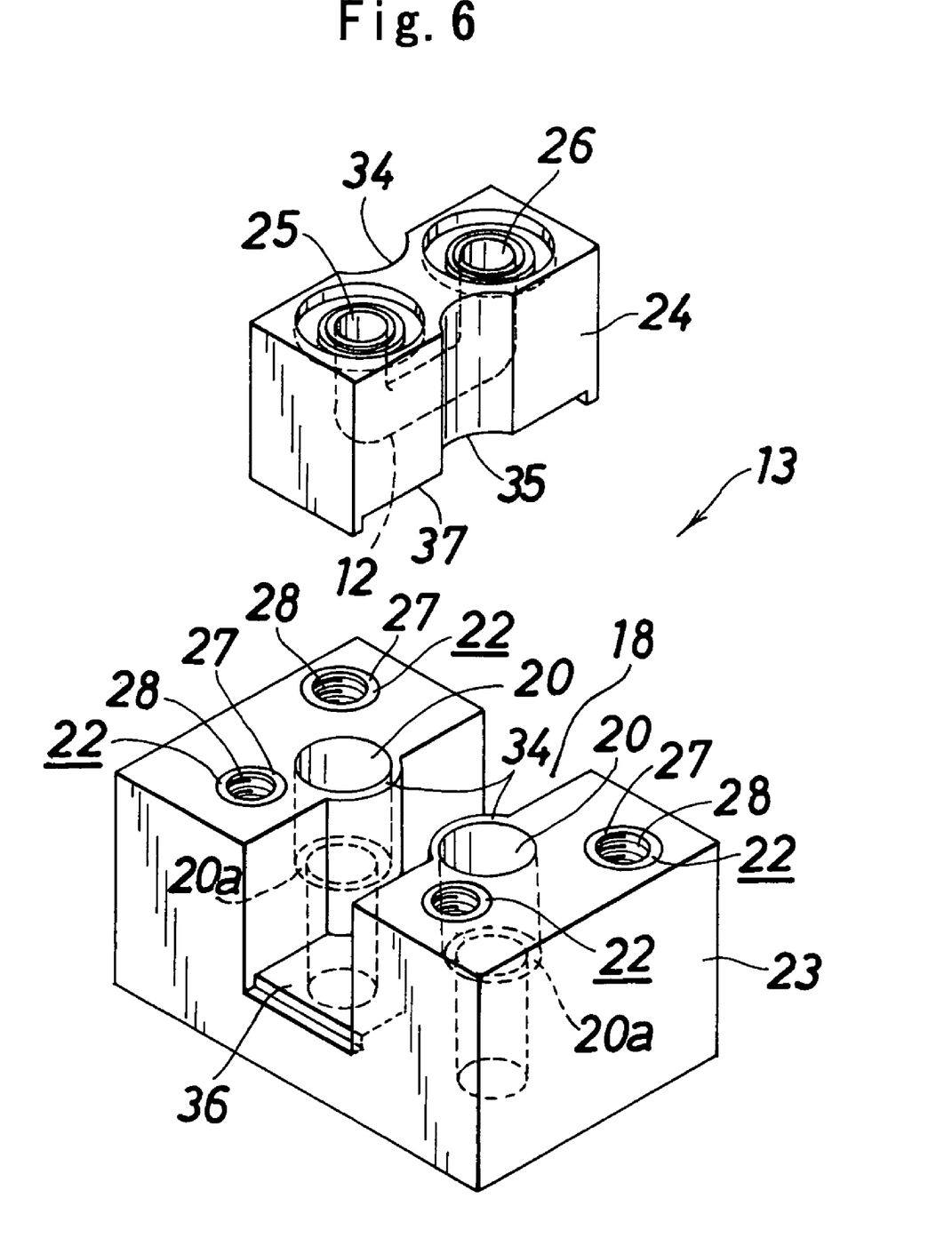
FIG. 6 is an enlarged exploded perspective view of the first joint of FIG. 2.

Female screws are not formed in the connecting member 23 which is made of polyamide 6 as stated above. With reference to FIGS. 4 and 5, the female screw portions 22 are therefore formed each by a female screw part 27 of stainless steel which is embedded in the connecting member 23. The female screw part 27 is in the form of a stainless steel cylinder having a female screw 28, has a head 30 which is slotted as at 29, and is fitted in a through bore 31 in the connecting member 23 in intimate contact with. The bore 31 extends through the connecting member 23 in the front-rear direction and has a head supporting stepped portion 31a. The female screw part 27 is fixed to the connecting member 23 by forcing a lock pin 33 into a bore 32 having a bottom and extending from the upper surface or left or right side surface of the member 23 through the head 30, whereby the screw part 27 is prevented from rotating with the male screw member 19. The slot 29 in the head 30 is provided for engaging in a driver for adjustingly rotating the female screw member 27 to register the hole for the head 30 with the bore in the connecting member 23.

The communication member 24 fitted in the connecting member 23 is prevented from slipping longitudinally of the groove 18. Stated more specifically, a first positioning protrusion 34 is provided in an outwardly bulging circular-arc form on each of opposite side surfaces of the connecting member 23 which define the groove 18 so as to partly include the stepped portion 20a of the bolt hole 20. A first positioning recessed portion 35 is provided in an inwardly curved circular-arc form in each of opposite side surface of the communication member 24, and is fitted to the protrusion 34. Further a second positioning protrusion 36 is formed on the bottom wall defining the groove 18 of the connecting member 23, and a second positioning recessed portion 37 is formed in the wall of the communication member 24. The second positioning protrusion 36 and recessed portion 37, although necessary when the first positioning protrusion 34 and recessed portion 35 are not provided, need not always be formed in the present case.

Figure 7:
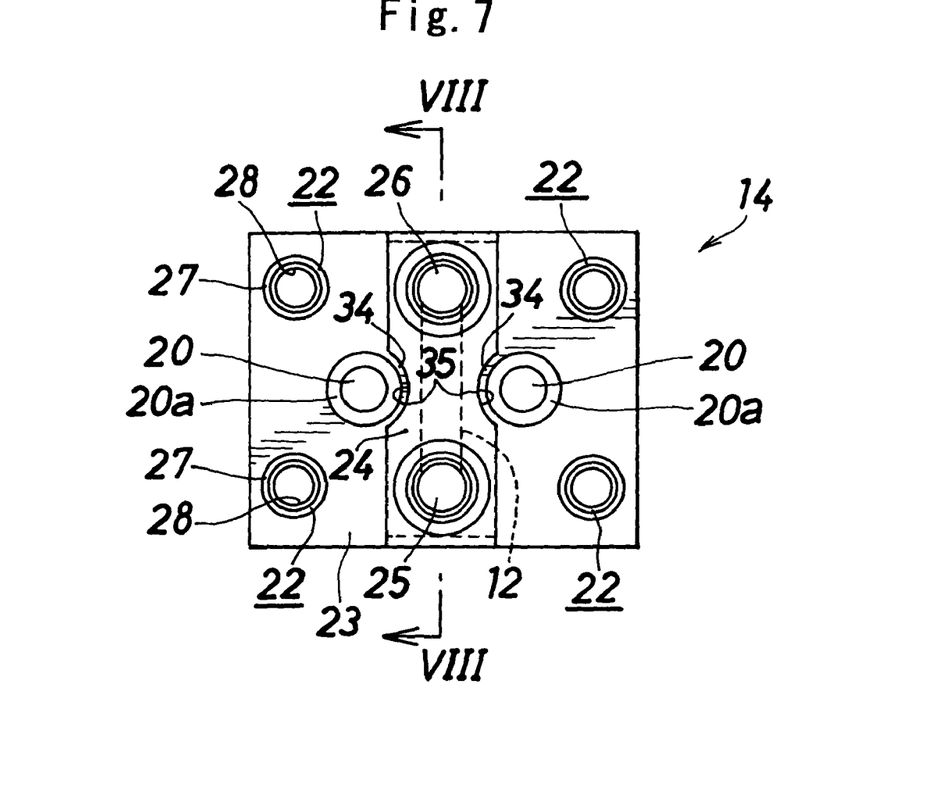
FIG. 7 is an enlarged front view showing in detail a first rectangular parallelepipedal joint as another embodiment of the invention.
Figure 8:
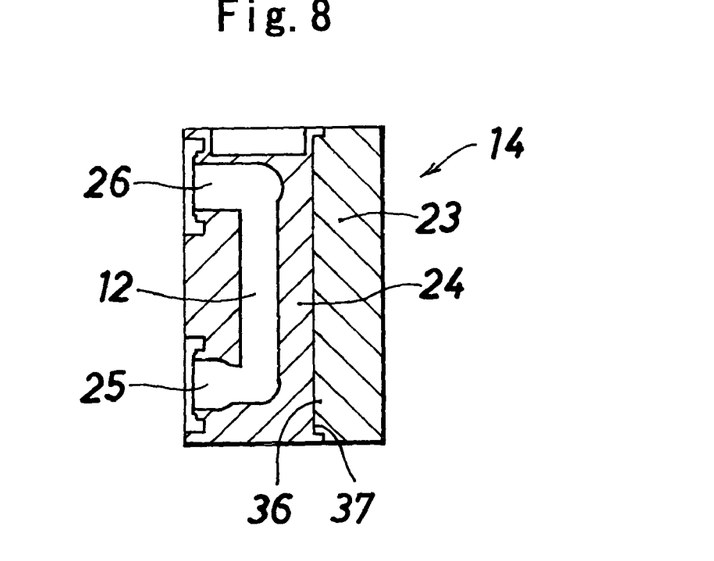
FIG. 8 is a view in section taken along the line VIII-VIII in FIG. 7.

FIGS. 7 and 8 show in detail another first rectangular parallelepipedal joint 14 which is the same as the first joint 13 except the joint width and the position of the pair of female screw portions 22 adjacent to the inlet 25 of the U-shaped communication channel 12. The first joint 14 shown differs from the first joint 13 already described in detail in that the joint 14 has a larger width than the joint 13, the pair of female screw portions 22 of the joint 14 adjacent to the inlet 25 of the communication channel 12 are positioned close to the corresponding corners of the connecting member 23 like the other pair of female screw portions 22 adjacent to the outlet 26. The joint 14 is used for connecting two apparatus components which are to be positioned respectively at the inlet (25) side of the communication channel 12 and the outlet (26) side thereof, have the same width and are greater in width than those to be attached to the joint 13 at opposite sides thereof.

Although not shown in detail, the other rectangular parallelepipedal joint 15 is the same as the joint 14 except that joint 15 has a smaller width than the joint 14.

Stated briefly, the width of the first rectangular parallelepipedal joint for connecting the fluid passage outlet of one of two adjacent apparatus components to the fluid passage inlet of the other apparatus component by the internal U-shaped communication channel of the joint is so determined as to correspond to the greater component width in the case where the two components are different in width; the spacing between the pair of female screw portions adjacent to the inlet of the U-shaped communication channel is made to correspond to the width of the apparatus component to be connected to these portions; and the spacing between the pair of female screw portions adjacent to the outlet of the communication channel is made to correspond to the width of the apparatus component to be connected to these portions.

Figure 9:
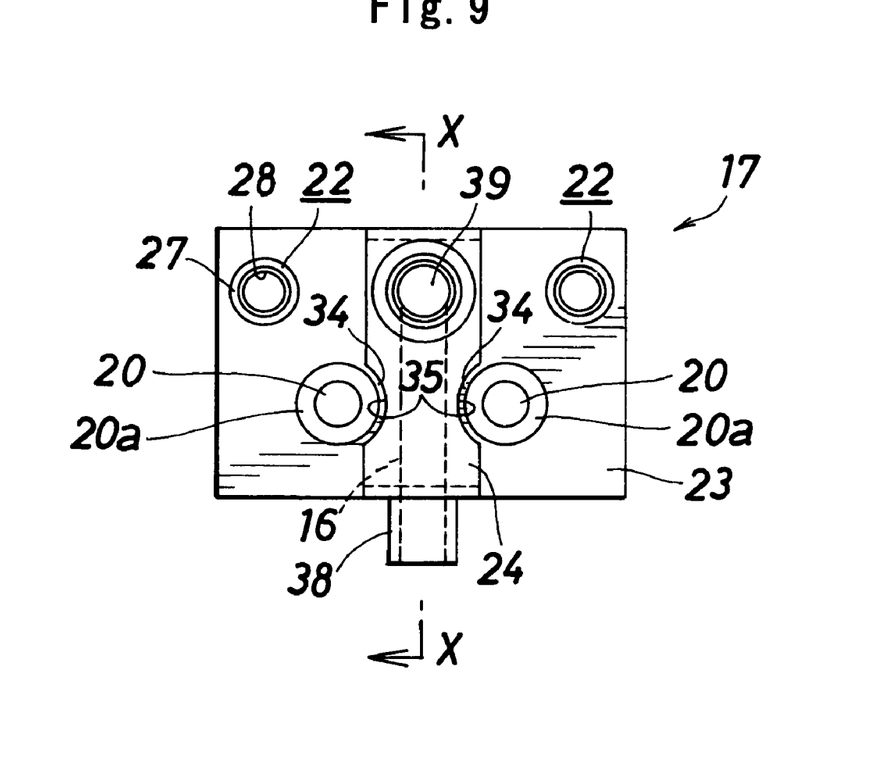
FIG. 9 is an enlarged front view showing in detail a second rectangular parallelepipedal joint as another embodiment of the invention.
Figure 10:
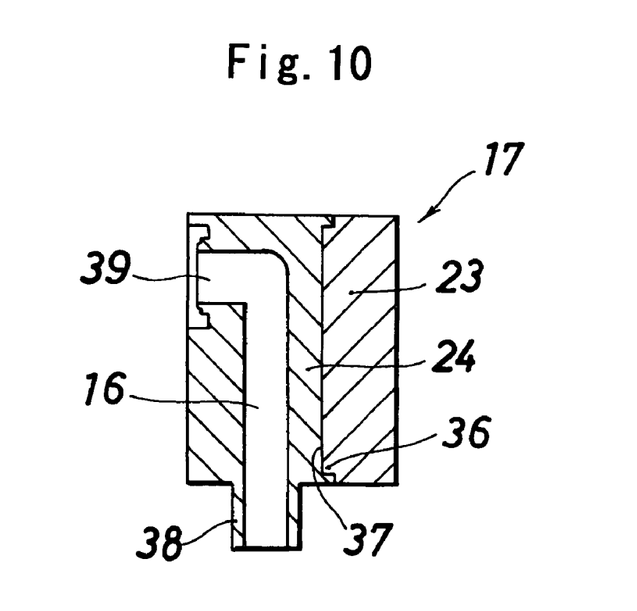
FIG. 10 is a view in section taken along the line X-X in FIG. 9.

FIGS. 9 and 10 show in detail the second rectangular parallelepipedal joint 17 embodying the invention for use in the fluid control apparatus E.

The second joint 17 shown in these drawings serves to connect the fluid passage inlet 9 of the apparatus component 7 at the lower end of the fluid control apparatus E to an external inlet pipe. An inlet member 38 in the form of a projecting short tube for connection to the external inlet pipe is provided at the lower end of the communication member 24. The second joint 17 differs from the first joint 13 in that the joint 17 has bolt holes 20 which are positioned in proximity to opposite side portions defining the groove 18 and closer to the lower end of the groove 18, and that the joint 17 has only a pair of female screw portions 22 which are positioned on opposite sides of the outlet 39 of the L-shaped communication channel 16 and which are also positioned in corners of the connecting member 23.

In the case where an L-shaped communication channel 16 is used for connecting an internal outlet pipe to the fluid passage outlet 10 of the apparatus component 8 at the upper end of the fluid control apparatus E, the illustrated joint 17 is used as turned upside down. When the joint 17 is used as so positioned, the bolt holes 20 are positioned in proximity to opposite side portions defining the groove 18 and closer to the upper end of the groove 18, the pair of female screw portions 22 are positioned on opposite sides of the inlet 40 of the L-shaped communication channel 16, and an outlet member 41 in the form of a projecting short tube for connection to the external outlet pipe is provided at the upper end of the communication member 24 (see FIG. 1).

The apparatus component 3, which is a 3-port closing valve, is positioned between the upper and lower joints 13, 13 and is provided with rectangular parallelepipedal joints 43 connected to other fluid control apparatus which are arranged at opposite sides of and adjacent to the present apparatus E. The joints 43 are connected to the flange 3a of the component 3 with respective left and right two male screw members 44 and each have an L-shaped communication channel 42. Since the joint 43 has such a small width as to provide the L-shaped communication channel 42, the joint 43 is entirely made from stainless steel as in the prior art and is no included in the present invention. The male screw member 44 is screwed into a female screw which is formed directly in the joint 43 of stainless steel so as not to reach the L-shaped communication channel 42.

The female screw part 27 described is in the form of a stainless steel cylinder having a female screw 28 and is fitted in a circular through bore in intimate contact with the connecting member 23. The lock pin can be dispensed with if the female screw member is in the form of a quadrangular or hexagonal prism which is to be tightly fitted into a through bore of corresponding cross section, since the female screw member can then be prevented from rotating with the male screw member.

Figure 11:
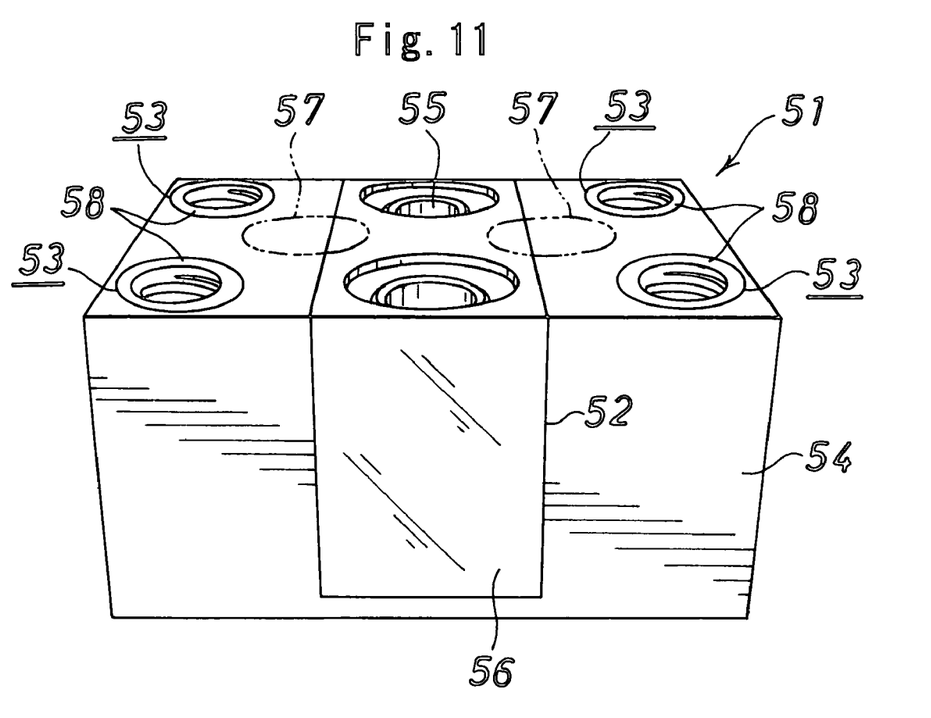
FIG. 11 is a perspective view of a modification of the first joint of FIGS. 7 and 8.

FIG. 11 shows a first rectangular parallelepipedal joint 51 which is a modification of the first joint 14 shown in FIGS. 7 and 8.

The joint 51 comprises a connecting member 54 of aluminum having a groove 52 formed in the midportion of its length and female screw portions 53 formed in its portions on respective opposite sides of the groove 52 and positioned at respective two corners of the member 54 for component attaching male screw members 21 to be screwed in, and a communication member 56 of stainless steel existing in the entire groove 52 and having a U-shaped communication channel 55. The connecting member 54 has two bolt holes 57 formed in its portions (indicated in chain lines in FIG. 11) on respective opposite sides of the groove 52, each positioned partly in both the member 54 and the communication member 56 and each having a stepped portion. Each of the female screw portions 53 is provided by a cylindrical female screw part 58 of stainless steel embedded in the connecting member 54.

The rectangular parallelepipedal joint 51 is cast in the following manner by the forging cast process. An elongated rectangular stainless steel bar having the same vertical section as the communication member 56 and a slightly larger height than the member 56 is placed on a flat plate member, and several stainless steel solid cylinders having the same horizontal section as the female screw part 58 and a slightly larger height than the part 58 are arranged on the flat plate member in a row at a predetermined spacing on each of opposite sides of the bar, and are fastened to the plate member with small screws. A rectangular frame mold is then fitted around the flat plate member, molten aluminum is thereafter poured into the mold with the stainless steel bar and the stainless steel solid cylinders serving as embedded metal pieces, and the molten metal is cast under pressure with the inserts placed therein. The mold is subsequently removed from the casing, which is then cut into a plurality of pieces corresponding in size to the first rectangular parallelepipedal joint 56 and each having a rectangular parallelepiped corresponding to the communication member 56 in size and four solid cylinders. The lower portions of each cast piece having the small screws are removed by cutting as by a lathe along with the flat member. In this way, a plurality of rectangular parallelepipedal cast blocks are obtained as specified. Each cast block is turned upside down, a U-shaped communication channel 55 is formed in the flat rectangular parallelepipedal portion to obtain a communication member 56 of stainless steel, and a female screw 53 is machined in each of the solid cylinder portions, whereby a connecting member 54 of aluminum is obtained with cylindrical screw parts 58 of stainless steel embedded therein. Two bolt holes 57 each having a stepped portion are made in the connecting member 54 at portions thereof on opposite sides of its central portion, as positioned partly in both the connecting member 54 and the communication member 56 integral therewith. In this way, the first rectangular parallelepipedal joint 51 is fabricated.

The first joint 51 is a modification of the first joint 14 shown in FIGS. 7 and 8. In the same manner as above and using the forgoing cast process, it is possible to obtain modifications of the first joint 13 shown in FIGS. 2 to 6, the first joint 15 which is only smaller in width than the first joint 14 and the second joint 17 shown in FIGS. 9 and 10.

The communication channels 12, 55, which are U-shaped in the foregoing embodiments, may alternatively be V-shaped.

The fluid control apparatus wherein joints of the invention are used and which are adapted for use in semiconductor manufacturing equipment has been described above as it is installed on a vertical wall with its length positioned vertically, whereas the fluid control apparatus for semiconductor manufacturing equipment may be installed on a vertical wall with its length positioned horizontally, or on a horizontal floor surface as the case may be.

Although adapted for use in semiconductor manufacturing equipment, the apparatus may alternatively be used for other equipment.

What is claimed is:

1. A joint for use in a fluid control apparatus comprising a plurality of components arranged in a row, for causing a fluid passage outlet of one of two apparatus components in each adjacent pair thereof to communicate with a fluid passage inlet of the other apparatus component, for causing a fluid passage outlet of another device or an external inlet pipe extending from a fluid source to communicate with a fluid passage inlet of the apparatus component at one end of the fluid control apparatus, or for causing an external outlet pipe provided for a device requiring a control fluid to communicate with a fluid passage outlet of the apparatus component at the other end of the fluid control apparatus, the joint being positionable on an apparatus installation side of the apparatus component and comprising a connecting member having a groove formed therein centrally thereof for the apparatus component to be fixed thereto with male screw members, and a communication member existing in the groove and having a communication channel, an entire length of the communication channel being formed in the communication member, the communication member being made of a corrosion-resistant material, the connecting member being made of a material smaller than the material of the communication member in specific gravity.

2. A joint for use in a fluid control apparatus according to claim 1 wherein the connecting member has embedded therein a female screw part for each of the male screw members to be screwed therein, the female screw part and the communication member being made of a stainless steel or stainless alloy, the connecting member being made of aluminum and entirely cast by a forging cast process.

3. A joint for use in a fluid control apparatus according to claim 2 wherein a bolt hole having a stepped portion is formed in each of opposite side portions of the connecting member, and a portion having the bolt hole formed therein protrudes from a face of the connecting member to at least partly fit into a recessed portion formed on the communication member.

4. In a fluid control apparatus to be disposed on a vertical wall, a rectangular parallelepipedal joint to be provided between a base plate and a required number of apparatus components arranged in a row and each having a fluid channel, the fluid channel having a fluid passage inlet and a fluid passage outlet both facing toward the base plate, the joint having an internal communication channel for causing therethrough a fluid passage outlet of one of the two apparatus components in each adjacent pair thereof to communicate with a fluid passage inlet of the other apparatus component, for causing therethrough a fluid passage outlet of another device or an external inlet pipe extending from a fluid source to communicate with a fluid passage inlet of the apparatus component at one end of the fluid control apparatus, or for causing therethrough an external outlet pipe provided for a device requiring a control fluid to communicate with a fluid passage outlet of the apparatus component at the other end of the fluid control apparatus, the joint comprising two divided members in its entirety, the two divided members being a grooved connecting member having a groove formed centrally thereof and provided in portions thereof on opposite sides of the groove with bolt holes each having a stepped portion for receiving therein a joint attaching bolt without permitting a head thereof to project from the joint and with female screw portions for respective male screw members to be screwed in for attaching the apparatus component; and a flat rectangular parallelepipedal communication member fitted in the groove of the connecting member and provided with the communication channel, an entire length of the communication channel being formed in the communication member, the connecting member being made of a stainless steel or stainless alloy, the communication member being made of a material smaller than the material of the connecting member in specific gravity, the connecting member and the communication member as fitted to each other having three pairs of opposed faces, a positioning recessed portion being formed in one face of at least one of the opposed pairs and fitting to a positioning protrusion formed on the other face thereof.

5. A joint for use in a fluid control apparatus according to claim 4 wherein the positioning protrusion is provided in an outwardly bulging circular-arc form on each of opposite side faces defining the groove of the connecting member and at least partially surrounds the stepped portion of the bolt hole, and the positioning recessed portion is provided in an inwardly curved circular-arc form in each of opposite side faces of the communication member.

6. A joint for use in a fluid control apparatus according to claim 5 wherein each of the female screw portions is provided by a female screw part made of a stainless steel or stainless alloy and embedded in the connecting member.

7. A joint for use in a fluid control apparatus according to claim 5 wherein the material of the communication member smaller than the material of the connecting member in specific gravity is a synthetic resin or aluminum.

8. A joint for use in a fluid control apparatus according to claim 4 wherein each of the female screw portions is provided by a female screw part made of a stainless steel or stainless alloy and embedded in the connecting member.

9. A joint for use in a fluid control apparatus according to claim 4 wherein the material of the communication member smaller than the material of the connecting member in specific gravity is a synthetic resin or aluminum.

* * * * *